(12) United States Patent
Delpuch

(10) Patent No.: US 7,069,579 B2
(45) Date of Patent: Jun. 27, 2006

(54) ON-DEMAND INTERACTIVE MAGAZINE

(75) Inventor: Alain Delpuch, Les Essarts le Roi (FR)

(73) Assignee: OpenTV, Inc., San Francisco, CA (US)

( * ) Notice: Subject to any disclaimer, the term of this patent is extended or adjusted under 35 U.S.C. 154(b) by 1091 days.

(21) Appl. No.: 09/870,429

(22) Filed: May 30, 2001

(65) Prior Publication Data

US 2002/0184648 A1 Dec. 5, 2002

(51) Int. Cl.
*H04N 7/16* (2006.01)

(52) U.S. Cl. .................. 725/135; 725/112; 725/38

(58) Field of Classification Search .............. 725/86, 725/87, 91–95, 109–112, 116, 135, 146
See application file for complete search history.

(56) References Cited

U.S. PATENT DOCUMENTS

| | | | |
|---|---|---|---|
| 4,855,725 A | 8/1989 | Fernandez | ............... 340/706 |
| 4,924,303 A | 5/1990 | Brandon et al. | |
| 5,027,400 A | 6/1991 | Baji et al. | |
| 5,220,420 A | 6/1993 | Hoarty et al. | |
| 5,371,532 A * | 12/1994 | Gelman et al. | ............... 725/88 |
| 5,404,505 A | 4/1995 | Levinson | |
| 5,612,730 A | 3/1997 | Lewis | |
| 5,729,549 A | 3/1998 | Kostreski et al. | |
| 5,749,735 A | 5/1998 | Redford et al. | |
| 5,957,695 A | 9/1999 | Redford et al. | ............. 434/307 |
| 5,982,445 A * | 11/1999 | Eyer et al. | ................. 348/461 |
| 5,986,690 A | 11/1999 | Hendricks | ..................... 348/7 |
| 6,034,680 A | 3/2000 | Kessenich et al. | ........... 345/329 |
| 6,047,317 A * | 4/2000 | Bisdikian et al. | ............ 725/142 |
| 6,052,717 A | 4/2000 | Reynolds et al. | ............ 709/218 |
| 6,317,885 B1 * | 11/2001 | Fries | ........................... 725/109 |
| 6,374,404 B1 * | 4/2002 | Brotz et al. | ................... 725/46 |
| 6,459,427 B1 * | 10/2002 | Mao et al. | .................... 725/109 |
| 6,778,222 B1 * | 8/2004 | Hirai et al. | .................. 348/461 |
| 2002/0138500 A1 * | 9/2002 | Bechtel et al. | ............ 707/104.1 |

FOREIGN PATENT DOCUMENTS

| | | |
|---|---|---|
| WO | WO 99/65230 | 12/1999 |
| WO | WO 02/39745 | 5/2002 |

* cited by examiner

*Primary Examiner*—Vivek Srivastava
(74) *Attorney, Agent, or Firm*—Meyertons Hood Kivlin Kowert & Goetzel, P.C.; Rory D. Rankin

(57) ABSTRACT

A method and system for providing an on-demand interactive magazine are disclosed. A method for processing a magazine generally comprises receiving a magazine and data associated with the magazine, receiving at least one broadcast, storing portions of the broadcasts, based on the data, and presenting the magazine to a user. In another embodiment, the method includes receiving broadcasts from a plurality of channels, and tuning to the channel on which a broadcast is to be received. The method also includes providing at least one hyperlink for selecting a stored broadcast portion. A system for providing an on-demand interactive magazine comprises a receiver operable to receive a magazine and data associated with the magazine, a receiver operable to receive at least one broadcast, a storage device, and a processor configured to use the data to store portions of the broadcasts and present the magazine to a viewer.

21 Claims, 9 Drawing Sheets

ON-DEMAND INTERACTIVE MAGAZINE

FIELD OF THE INVENTION

The present invention relates generally to interactive video delivery mediums such as interactive television, and more particularly, to a system and method for providing multimedia information on demand within an interactive magazine.

BACKGROUND

A broadcast service provider transmits audio-video streams to a viewer's television. Interactive television systems are capable of displaying text and graphic images in addition to typical audio-video programs. They can also provide a number of services, such as commerce via the television, and other interactive applications to viewers. The interactive television signal can include an interactive portion consisting of application code, data, and signaling information, in addition to audio-video portions. The broadcast service provider can combine any or all of this information into a single signal or several signals for transmission to a receiver connected to the viewer's television or the provider can include only a subset of the information, possibly with resource locators. Such resource locators can be used to indicate alternative sources of interactive and/or audio-video information. For example, the resource locator could take the form of a world wide web universal resource locator (URL).

The television signal is generally compressed prior to transmission and transmitted through typical broadcast media such as cable television (CATV) lines or direct satellite transmission systems. Information referenced by resource locators may be obtained over different media, for example, through an always-on return channel, such as a DOCSIS cable modem.

Currently, TV news is presented linearly to the viewer. Some TV channels present news two or three times a day, while some dedicated channels (such as CNN) deliver news all day long, repeating the information every 15 to 30 minutes. The information is updated regularly, but generally not as quickly as the 15 to 30 minute cycle, and the ability to provide interactive news on demand is constrained by bandwidth limitations.

There exists a need for an improved system and method for providing on-demand interactive video and audio, particularly in the context of interactive news.

SUMMARY OF THE INVENTION

A method and system for providing an on-demand interactive magazine are disclosed. A method for processing a magazine generally comprises receiving a magazine and data associated with the magazine, receiving at least one broadcast, storing portions of the broadcasts, based on the data, and presenting the magazine to a user.

In one embodiment, the method includes receiving broadcasts from a plurality of channels, and tuning to the channel on which a broadcast is to be received. The method also includes providing at least one hyperlink for selecting a stored broadcast portion.

In one embodiment, a system for providing an on-demand interactive magazine comprises a receiver operable to receive a magazine and data associated with the magazine, a receiver operable to receive at least one broadcast, a storage device, and a processor configured to use the data to store portions of the broadcasts and present the magazine to a viewer.

Other features, advantages, and embodiments of the invention will be apparent to those skilled in the art from the following description, drawings, and claims.

DESCRIPTION OF THE INVENTION

Figure 1:
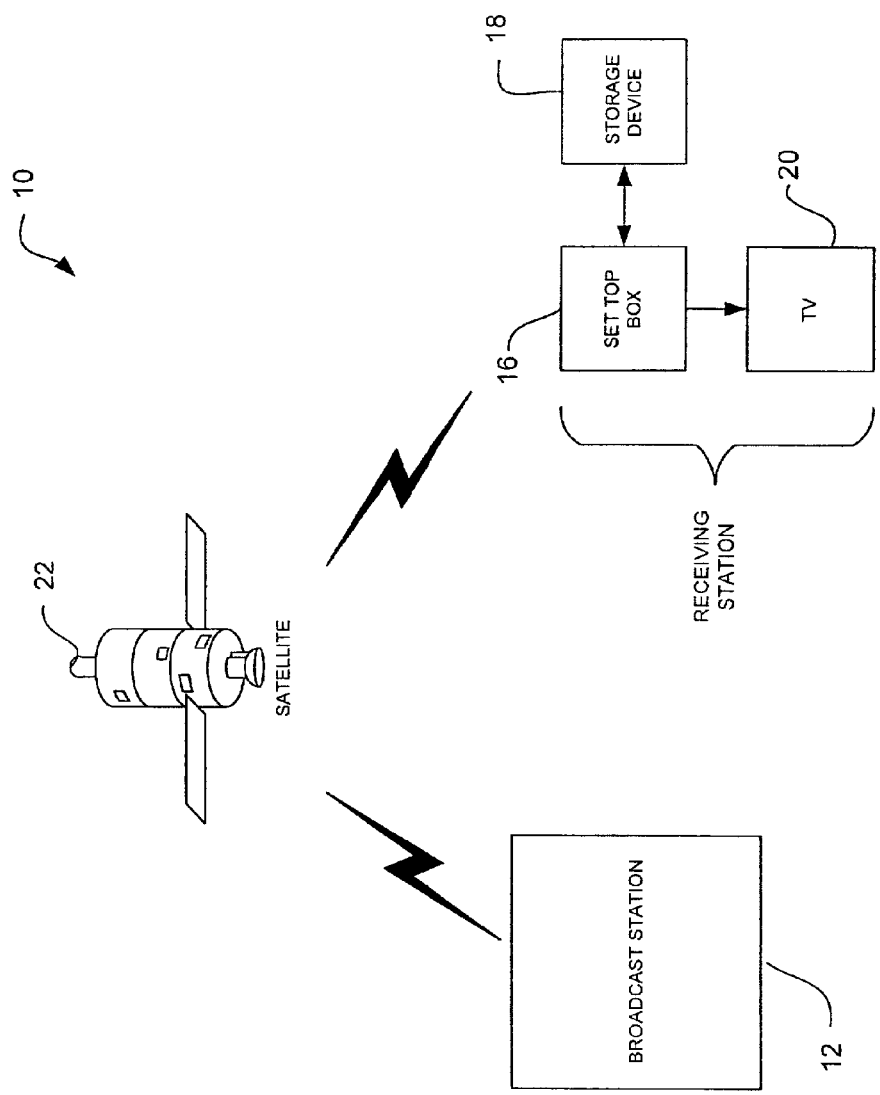
FIG. 1 is a diagram illustrating the distribution of television programs and signaling information from a broadcast station to a receiving station.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. Many embodiments are possible, such as the use of a computer system and display to perform the functions and features described herein. For purpose of clarity, the invention will be described in its application to a set top box used with a television, and details relating to technical material that are known in the technical fields related to the invention have not been included.

A set top box connected to the television controls the interactive functionality of the television. The set top box receives the signal transmitted by the broadcast service provider, separates the interactive portion from the audio-video portion, and decompresses the respective portions of the signal. The set top box uses interactive information to execute an application while the audio-video information is transmitted to the television. Set top boxes generally include only a limited amount of memory. While this memory is sufficient to execute interactive applications, it is typically not adequate to store the applications for an indefinite period of time. Further, the memory of the set top box is typically too small to accommodate a program which includes large amounts of audio or video data, application code, or other information. Storage devices may be coupled to the set top box to provide additional memory for the storage of video and audio broadcast content. However, the amount of storage space is finite, and management of stored video and audio broadcast content is needed.

Interactive content such as application code or information relating to television programs is generally broadcast in a repeating format. The pieces of information broadcast in this manner form what is referred to as a "carousel". Repeating transmission of objects in a carousel allows the reception of those objects by a receiver without requiring a return path from the receivers to the server. If a receiver needs a particular piece of information, it can simply wait until the next time that piece of information is broadcast, and then extract the information from the broadcast stream. If the information were not cyclically broadcast, the receiver would have to transmit a request for the information to the server, thus requiring a return path or a point-to-point connection. If a user is initially not interested in the carousel content, but later expresses an interest, the information can be obtained the next time the carousel is broadcast.

Since broadcast networks have access only to a limited bandwidth, audio-video content is generally not broadcast in carousels. There is also insufficient bandwidth and server resources to handle pulling of large amounts of data required for video and audio in real-time to handle near simultaneous requests for broadcast of different material from a vast number of television viewers. Point-to-point connections generally also lack sufficient bandwidth for providing high-quality video and audio. Thus, due to bandwidth constraints, video and audio provided on-demand are generally of relatively poor quality. Multimedia presentations, such as interactive magazines and other applications, are limited in their ability to provide video and audio by bandwidth limitations, as will be described below.

A multimedia presentation may comprise a mixture of text, still graphics, sounds, audio clips, video clips, applications, and other multimedia elements. In one embodiment, the multimedia presentation is in the form of a magazine that may, for example, include several presentations on a variety of topics. The magazine may be implemented by broadcasting carousels of news pages, and providing the capability to navigate from one page to another. However, due to bandwidth limitations, such news pages would contain text, still pictures, some audio, and no video. Another implementation would be "enhanced news", where the pages are displayed on top of the TV channel, mixing the on-demand page access with the linear video. The viewer would be able to change news pages interactively, but would not be able to change the video or accompanying audio track for the video. This limits the ability of the system to display video corresponding to different pages.

In a point-to-point system, an interactive magazine (or other multimedia presentation) may be implemented by using video servers and providing information pages with on-demand video. However, this requires very high bandwidth to respond to near simultaneous requests for different content, and does not scale well to a large number of users. With low bandwidth, the video quality is relatively poor. As described herein, the invention provides for realtime, up-to-date, on-demand video hyperlinked within an interactive magazine. It should be understood that the interactive magazine is presented to illustrate the invention, and that the concepts presented herein are applicable to any type of multimedia presentation.

Referring now to the drawings, and first to FIG. 1, a diagram of a television broadcast and receiving system is shown and generally indicated at 10. The system 10 includes a broadcast station 20 where audio-video and control information is assembled in the form of digital data and mapped into digital signals for satellite transmission to a receiving station. The information includes magazine pages and data identifying broadcast data to be flagged. The data identifying broadcast data may be referred to as metadata. Metadata includes definitional data that provides information about or documentation of data managed within an application or environment, and may document data about data elements, data attributes, records, data structure, and other data. Metadata may include descriptive information about the context, quality and condition, or characteristics of the data.

Control information such as conditional access information and signaling information (such as a list of services available to user, event names, and schedule of events (start time/date and duration), and program specific information) may be added to video, audio, and interactive applications for use by the interactive television system. The information is converted by the broadcast station to a format suitable for transmission over broadcast medium. The data may be formatted into packets, for example, which can be transmitted over a digital satellite network. The packets may be multiplexed with other packets for transmission. The signal is generally compressed prior to transmission and may be transmitted through broadcast channels such as cable television lines or direct satellite transmission systems 22 (as shown in FIG. 1). The Internet, telephone lines, cellular networks, fiber optics, or other terrestrial transmission media may also be used in place of the cable or satellite system. Further, some or all of the information may be transmitted by transmitting station 14 instead of or in addition to information transmitted by the broadcast station 12, in a broadcast or point-to-point connection (push or pull). For example, transmitting station 14 could be an Internet host sending magazine pages and metadata via a lower bandwidth connection. Various combinations and allocations are possible, and it should be understood that all references to broadcast station 12 may apply equally to transmitting station 14 as well.

The broadcaster may embed service information in the broadcast transport stream, and the service information may list each of the elementary stream identifiers and associate with each identifier an encoding that describes the type of the associated stream (e.g., whether it contains video, audio, or application code) and metadata that can be used to uniquely identify a stream to the receiver for further processing, as described below.

The receiving station includes a set top box 16 connected to a storage device 18, and a television 20 which is used to present programs to a viewer. The set top box 16 is operable to decompress the digital data and display programs to a viewer. The decompressed video signals may be converted into analog signals such as NTSC (National Television Standards Committee) format signals for television display. Signals sent to the set top box 16 are filtered and of those that meet the filtering requirements, some are used by the processor 30 immediately and others can be placed in local storage such as RAM. Examples of requirements that would need to be filtered for include a particular value in the location reserved for an elementary stream identifier or an originating network identifier. The set top box 16 may be used to overlay or combine different signals to form the desired display on the viewer's television 20, such as when presenting an interactive news magazine to the viewer. In this case, stored signals may be displayed integral with the magazine, such as within the displayed magazine.

As described herein, the magazine may comprise text, still pictures, sound, audio clips, video clips, and other multimedia objects (such as executable applications), and these elements may be arranged in pages. Broadcast station 12 broadcasts magazine pages and metadata associated with the magazine, which are received by the set top box 16. The magazine pages or other multimedia presentation broadcast by broadcast station 12 or transmitted by transmitting station 14 may include some text, still pictures, sound, limited audio/video clips, and other multimedia objects, subject to bandwidth limitations. Magazine pages and metadata may be broadcast in a carousel on a dedicated channel, on top of a regular broadcast program on a channel, or fetched via a point-to-point connection as described herein. Broadcast station 12 also broadcasts various programs, some of which may contain video and/or audio streams referenced by the metadata. Portions of the magazine may be contained in different broadcasts transmitted at different times, on different channels, or by different transmission media.

Set top box 16 is configured to record one or more of the video and/or audio streams in accordance with the metadata. When pages of the magazine are displayed, the recorded audio and/or video clips are retrieved from a storage device 18 and merged with other assets of the magazine to be presented to the viewer. The present invention allows for an interactive magazine (which may be broadcast or transmitted point-to-point) that uses audio/video/application clips that have been previously broadcast and stored in a local storage device, thereby minimizing the bandwidth required to implement an interactive magazine. In fact, the additional bandwidth may be no greater than the amount required to transmit the metadata associated with the magazine. The present invention efficiently utilizes bandwidth by permitting a broadcast clip to be used as part of a broadcast program and as part of an interactive magazine in which the clip is presented to the viewer on demand. In one embodiment, all or part of the data may be transmitted via a point-to-point connection (such as via an Internet TCP/IP or PPP connection).

As used herein, "program" refers to any broadcast material including television shows, sporting events, news programs, movies, or any other type of broadcast material, or a segment of the material. The material may include only text, still graphics, audio, video, data, or any combination thereof. The program may be only a portion of a television show or broadcast (e.g., without commercials or missing a portion of the beginning or end) or may be more than one show, or include commercials for example. The set top box 16 may be configured to receive the metadata and magazine elements when the viewer is not viewing or recording a program using the set top box 16, or may comprise another tuner 24 for tuning to the necessary channels to receive the metadata and magazine elements while the viewer is using a set top box 16 tuner to tune to a program on a different channel. In one embodiment, any tuners not being used by the viewer to view or record a channel may be used to receive the interactive magazine and elements thereof.

The audio-video signals and program control signals received by the set top box 16 correspond to television programs and menu selections that the viewer may access through a user interface. The viewer may control the set top box 16 through an infrared remote control unit, a control panel on the set top box, or a menu displayed on the television screen, for example.

The system 10 described above and shown in FIG. 1 is only one example of a system used to convey signals to the television 20. The broadcast network system may be different than described herein without departing from the scope of the invention.

The set top box 16 may be used with a receiver or integrated decoder receiver that is capable of decoding video, audio, and data, such as a digital set top box for use with a satellite receiver or satellite integrated decoder receiver that is capable of decoding MPEG video, audio, and data. The set top box 16 may be configured, for example, to receive digital video channels which support broadband communications using Quadrate Amplitude Modulation (QAM) and control channels for two-way signaling and messaging. The digital QAM channels carry compressed and encoded multiprogram MPEG (Motion Picture Expert Group) transport streams. A transport system extracts the desired program from the transport stream and separates the audio, video, and data components, which are routed to devices that process the streams, such as one or more audio decoders, one or more video decoders, and optionally to RAM (or other form of memory) or a hard drive. The set top box 16 and storage device 18 may be analog, digital, or both analog and digital.

Figure 2:
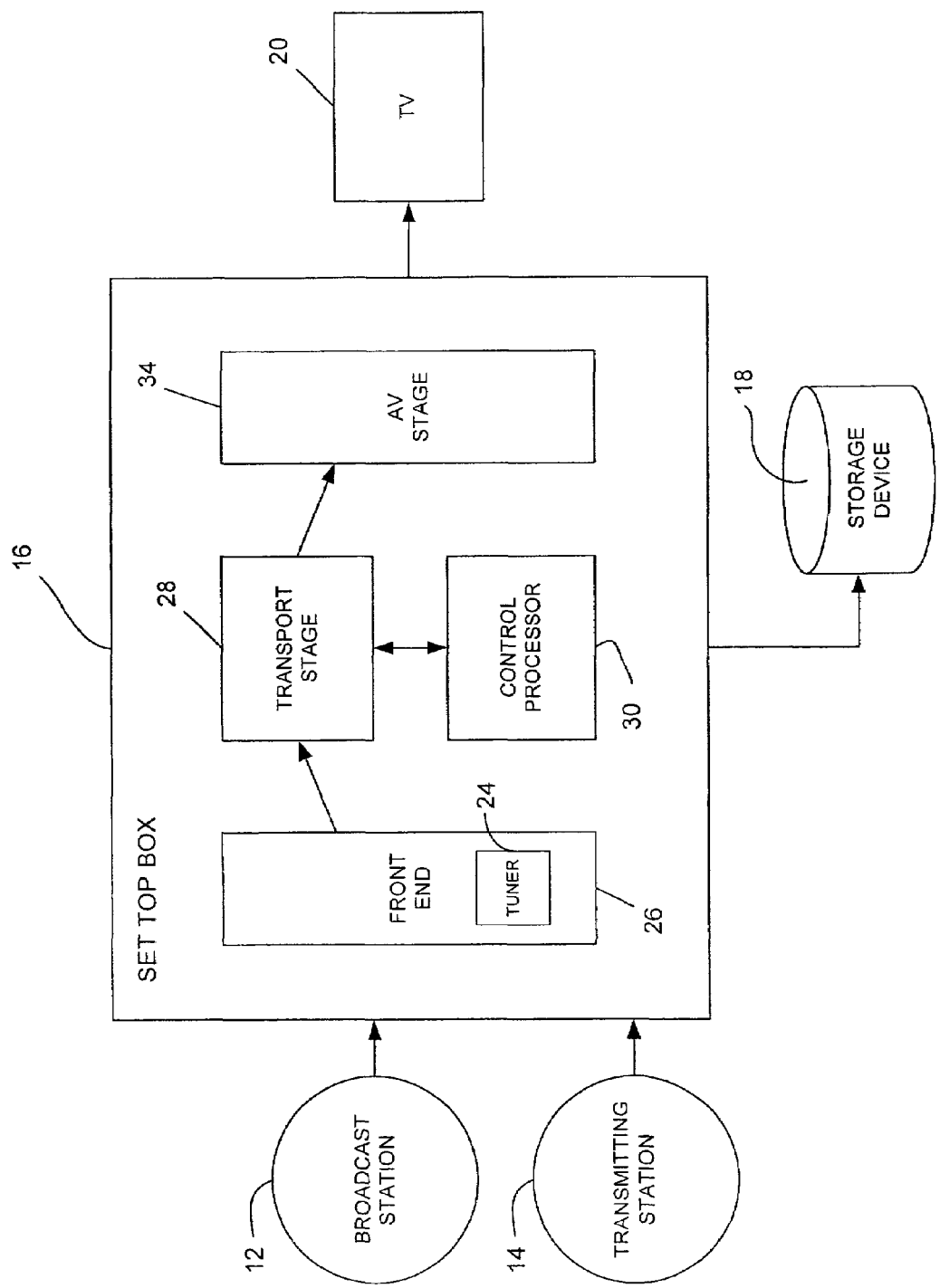
FIG. 2 is a block diagram of a system of the present invention for storing portions of programs received from the broadcast station or a transmitting station.

As shown in FIGS. 1 and 2, the storage device 18 is coupled to the set top box 16. The storage device 18 is used to provide sufficient storage to record programs that will not fit in the limited amount of main memory (e.g., RAM) generally available in set top boxes. The storage device 18 may comprise any suitable storage device, such as a hard disk drive, a recordable DVD drive, magnetic tape, optical disk, magneto-optical disk, flash memory, or solid state memory, for example. The storage device 18 may be internal to the set top box 16 or connected externally (e.g., through an IEEE 1394-1995 connection) with either a permanent connection of a removable connection. More than one storage device 18 may be attached to the set top box 16. The set top box 16 and/or storage device 18 may also be included in one package with the television set 20.

FIG. 2 illustrates one embodiment of a system of the present invention used to record programs received from the broadcast station 12. The set top box 16 generally includes a control unit (e.g., microprocessor), main memory (e.g., RAM), and other components which are necessary to select and decode the received interactive television signal. As shown in FIG. 2, the set top box 16 includes a front end 26 operable to receive audio, video, and other data from the broadcast station 12 and transmitting station 14. The broadcast source is fed into the set top box 16 at the front end 26, which comprises an analog to digital (A/D) converter and tuner/demodulators 24, and may further comprise an interface, such as a modem or line card (not shown), for communicating with the transmitting station. The front end 26 filters out a particular band of frequencies, demodulates it and converts it to a digital format. The digitized output is then sent to a transport stage 28. The transport stage 28 further processes the data, sending a portion of the data to an audio-visual (AV) stage 34 for display and another portion to the control processor 30, and filtering out the rest of the data. The front end 26 may also receive transmissions from transmitting station 14, which are processed (deframed, for example) and sent to control processor 30.

Control information may also be recorded as received along with the audio-video data or may be first manipulated by software within the set top box 16. For example, broadcast CA (conditional access) information may be used to decrypt broadcast video. The original broadcast streams, or modifications of these streams may be optionally re-encrypted using a set top box key or algorithm prior to recording. The encrypted video may also be stored as received along with the broadcast CA information. Also, clock information may be translated to a virtual time system prior to recording. An MPEG-2 elementary stream may be de-multiplexed from an MPEG-2 transport stream, then encapsulated as a program stream and recorded.

Magazine information and metadata may be extracted from the broadcast data (which may be obtained from a single broadcast or several broadcasts), or received separately through a point-to-point connection. The magazine information may be stored by control processor 30 (if, for example, the viewer has indicated an interest in that magazine), and the metadata used by control processor to determine which portions of the broadcast data to store, such as audio/video clips. For example, the metadata may be compared to the viewer profile to determine which portions of the broadcast data should be stored.

Figure 3:
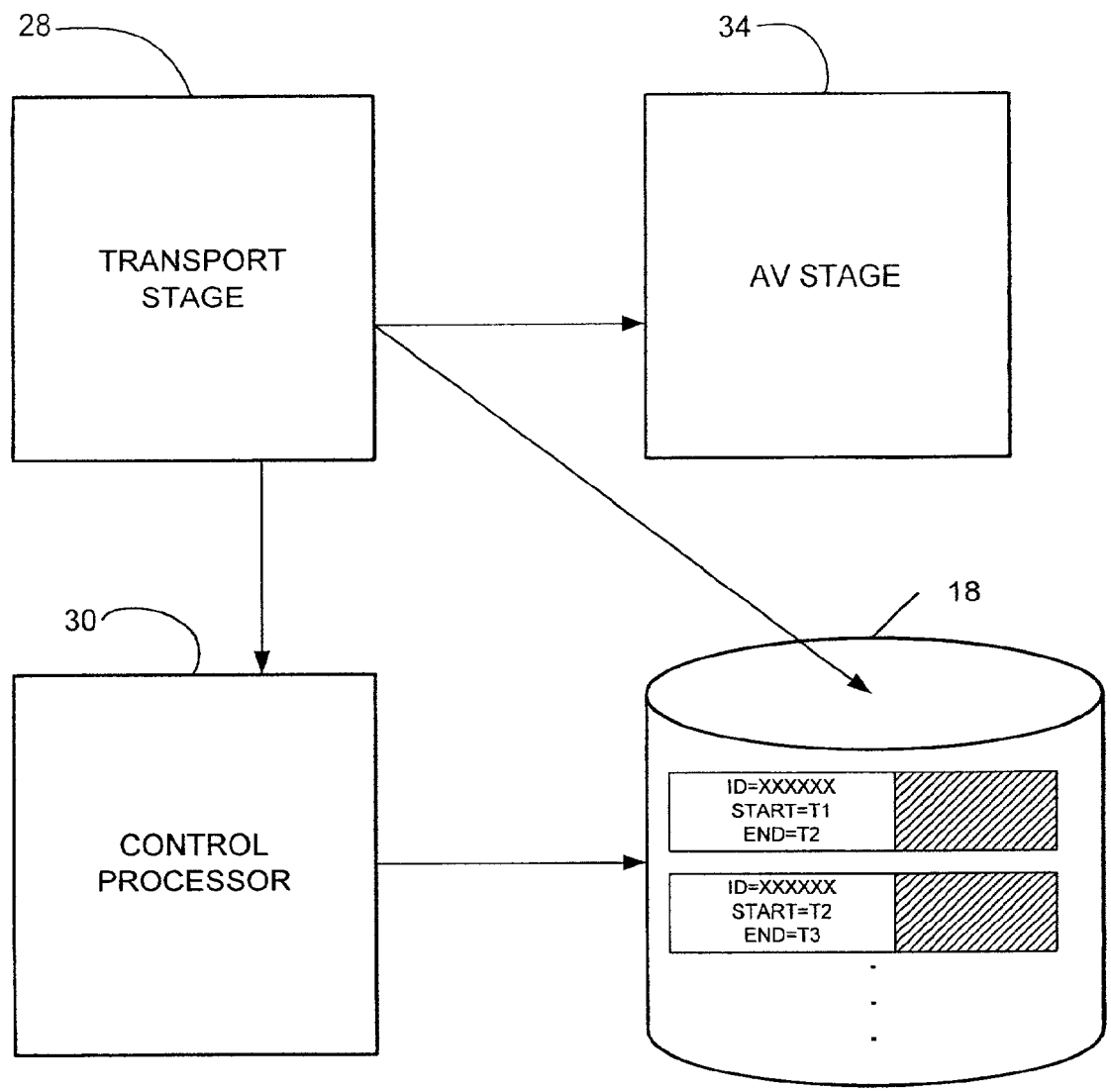
FIG. 3 is a block diagram illustrating the transfer of data to a storage device coupled to the set top box of FIG. 2.

FIG. 3 illustrates the transfer of data from the transport stage 28 to the storage device 18. The storage device 18 generally contains a plurality of programs or portions thereof that have been recorded by a viewer, or by the set top box 16 in accordance with magazine metadata. The storage device 18 may also contain magazine pages and magazine metadata, which the control processor 30 has caused to be stored. The recordings are associated with identifying information that may have been copied or modified from the original signaling information and/or metadata. This identifying information may contain bookkeeping information similar to that stored in audio/video file systems or hierarchical computer file systems, or to hyperlinks (such as in the form of uniform resource locators). The identifying information may have various formats and content, as long as it provides sufficient information to allow the system or the viewer, possibly interacting with the system, to uniquely retrieve a particular recording or portion thereof (such as an audio or video clip). The programs may be identified with an ID number and a start time and end time.

As described below, the storage may be defragmented periodically so that the programs are stored in a contiguous manner. Direct memory access (DMA) is preferably used to send data from the transport stage 28 to the storage device 18. The data that is sent to the control processor 30 may include metadata that describes the content of the data streams and may also include application programs and corresponding data that can be executed on the control processor in order to provide interactive television.

When the program (or portion thereof) referenced by the metadata is being received, its associated data is sent from the transport stage 28 to the storage device 18. If the program referenced by magazine metadata is currently being viewed, a copy of the data sent from the transport stage 28 to the storage device 18 is also sent to the AV stage 34. In either case, the CPU in the control processor 30 configures a DMA controller to ensure that the data is written to a buffer that is allocated in the storage device 18. The amount of magazine data (such as minutes of audio/video clips) to be recorded in the buffer may be specified by the magazine metadata, selected by the viewer, or a default value such as fifteen minutes. The control processor's CPU calculates the size of the buffer to allocate based upon the number of minutes and the maximum speed at which bits in the transport stream that the viewer is watching will be sent. This maximum speed may be obtained from the metadata. When the end of the buffer is reached, the CPU in the control processor is interrupted, at which time it will re-configure the DMA controller to start writing at the beginning of the buffer. This design is known as a circular buffer. More than one such buffer may be set up on the storage device 18.

The buffer may be circular to allow contiguous recording and writing over of previously recorded content. When the control processor 30 determines that a clip has finished recording, recording may be interrupted. At this time, the control processor 30 may allocate a new buffer or mark the end of the clip in the original buffer. Once the control processor 30 detects that another clip referenced by the metadata is being broadcast, the control processor 30 may cause front end 26 to tune to the proper channel using tuner 24, and may mark the beginning of the new clip in the buffer and begin recording as described above. Other methods of storing and tracking recorded portions may be used, such as a First In First Out (FIFO) queue or viewer-specified prioritization of magazines. The automatic recording of various portions of a broadcast, such as audio and video clips, in a storage device without any action by the viewer, facilitates provision of the interactive magazine to the viewer on demand.

As previously described, the control processor 30 records the various clips referenced by the metadata to store the clips in storage device 18. The clips will continue to be recorded and stored within the storage device 18 until all clips referenced by the metadata have been obtained. These clips may be associated with a single magazine or a plurality of magazines, and some may be associated with more than one magazine.

The joining of the first and second recorded portions of any given clip in a common storage area may be implemented either physically or virtually. A physical implementation may include copying the first recorded portion to a location where the second portion has been recorded. A virtual implementation may include the modification of a data structure stored in a storage device. In either case, a viewer watching a replay of any clip should not be able to detect that the two parts of the clip were originally stored separately. Thus, the portions of the clip may be physically contiguous or the portions of the clip may be stored separately in a non-contiguous format as long as the entire recorded portion can be played back in a continuous manner (i.e., viewer does not notice a transition between the playback of the first and second portions of the clip).

As described above, the recording of the entire magazine (or plurality of magazines), including the clips, in the storage device 18 may occur without any action by the viewer. For example, if the viewer selects a magazine as being of interest, the system 10 will automatically store the magazine pages and metadata for that magazine, and store clips and other broadcast portions used by the magazine and referenced by the metadata. In one embodiment, the broadcast content may be filtered by comparing the metadata with the viewer profile.

The control information that is broadcast with the program may include identifiers that enable the set top box 16 to identify programs and portions of programs by filtering on the appropriate identifiers in the broadcast MPEG-2 (or DSS or other encoding) packets. The set top box 16 records in the storage device 18 the content of the relevant streams, along with other related streams, including related video, audio, executables, and data. Metadata that indicates the maximum bit rate for the streams may accompany the elementary or transport streams. The format of the recorded streams may depend upon the hardware support. For example, special purpose hardware inside the set top box 16 may support re-multiplexing of streams or concurrent reads and writes to the storage device 18.

Broadcast data such as audio and video data, application code, control signals and other types of information may be sent as data objects. If the program is to be consumed (i.e., presented to the viewer) the broadcast data must be parsed to extract data objects from the stream. When the necessary data objects have been extracted, the program is played. For example, any applications that need to be executed are launched and any audio or video data that needs to be presented to the viewer is played. If the program is stored, the data objects are extracted in the same manner, but they are stored instead of being immediately used to present the program. The recorded program is played back using the stored data objects. The data objects may include "live" data which becomes obsolete if not consumed immediately. If this data is stored and used when the program is played back, the program will in at least part, be obsolete. Thus, while most of the data objects may be stored as files, live data objects may be stored as references in the program. When the program is played back, new live data corresponding to the reference may be obtained and used in place of the data which was live at the time the program was recorded. Thus, only temporally correct data is used by the interactive application when it executes at a later time.

Figure 4:
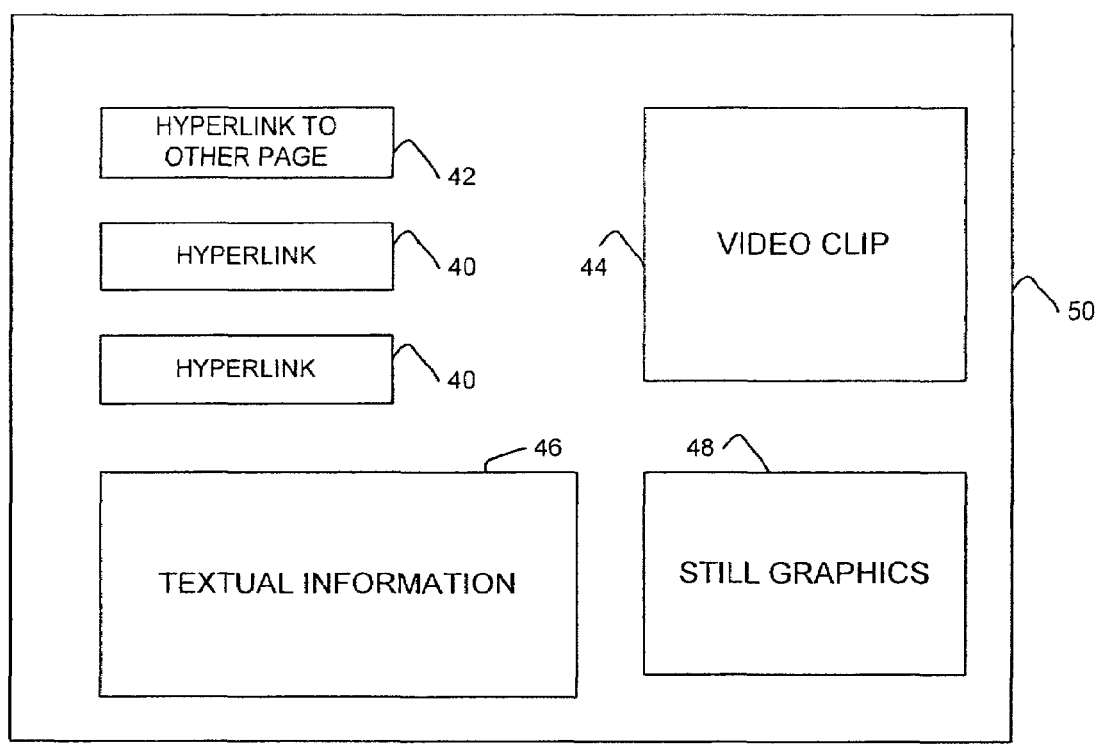
FIG. 4 is a diagram illustrating a typical magazine page containing various multimedia objects.
Figure 5:
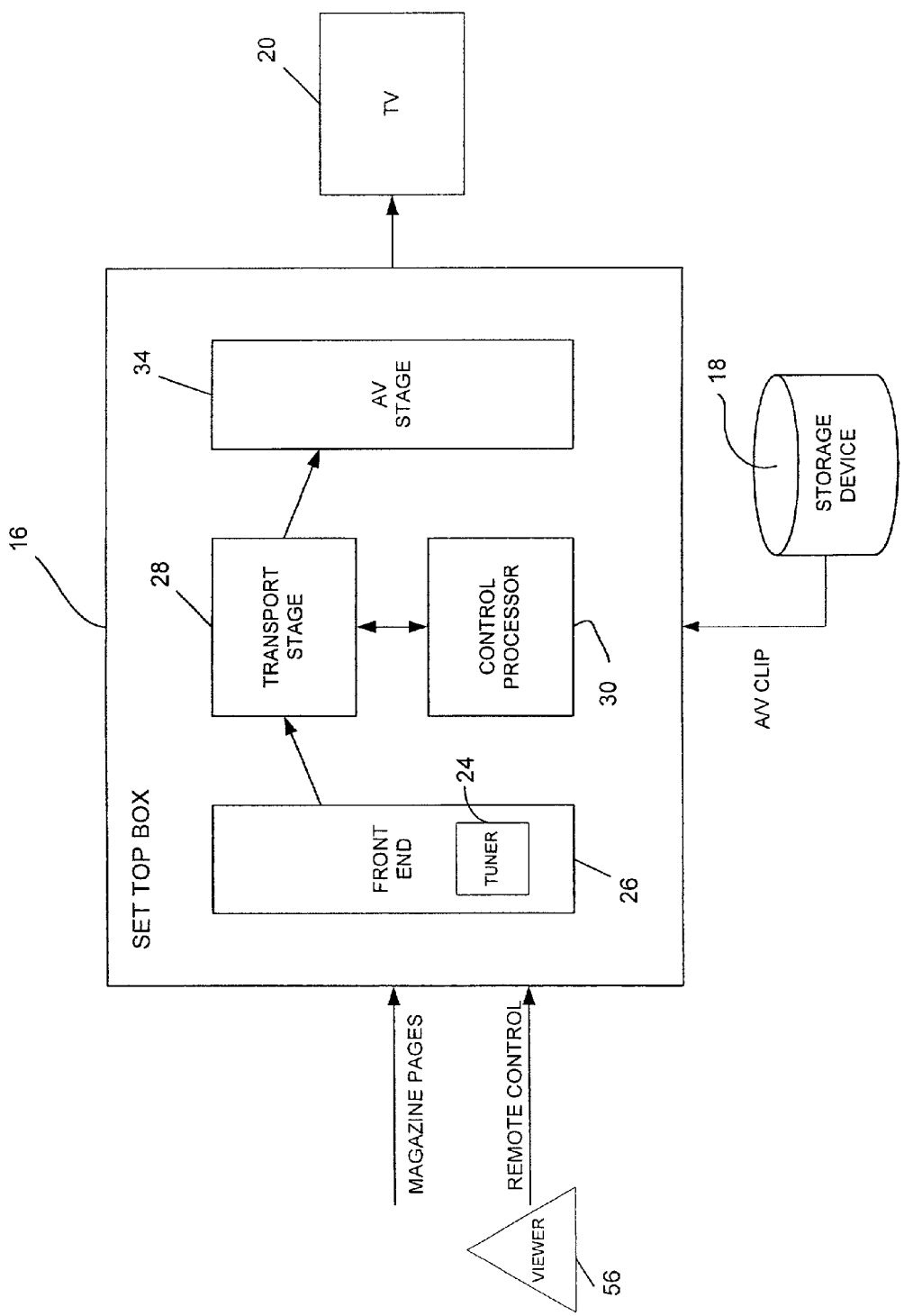
FIG. 5 is a block diagram illustrating the retrieval of stored portions from the storage device and their combination with magazine pages to be presented to the viewer.
Figure 6:
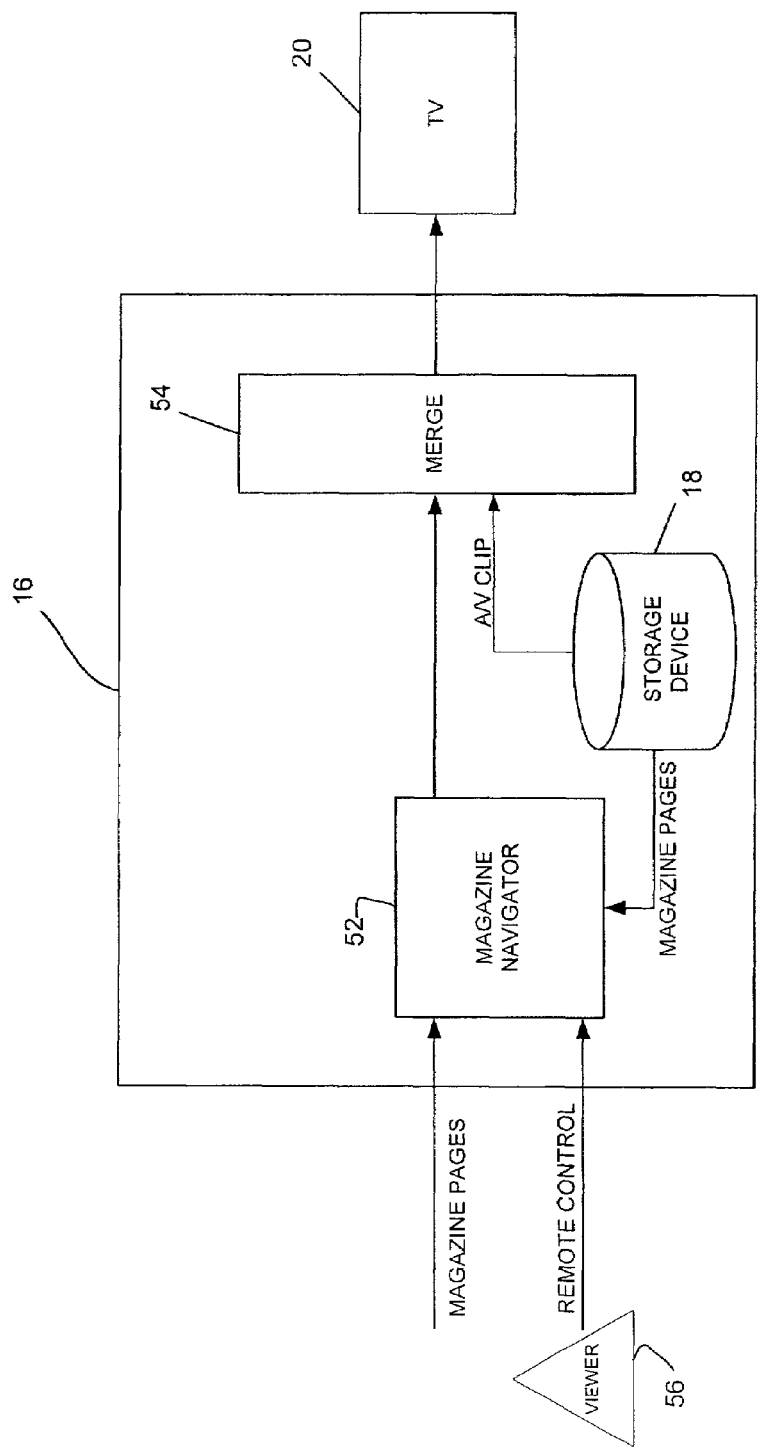
FIG. 6 is a functional diagram illustrating how a magazine navigator, under control of the viewer, receives or retrieves magazine pages and forwards them to be merged with stored portions for presentation to the viewer.

FIG. 4 illustrates a typical magazine page 50 containing multimedia objects such as text 46, hyperlinks 40 and 42, still graphics 48, and video clip 44. The viewer may watch a stored magazine page, or such magazine pages could be retrieved on the fly from the broadcast station 12 or transmitting station 14, as described above. FIG. 5 illustrates the retrieval of clips from the storage device 18 and their combination with other assets of the magazine (such as magazine pages) to be presented to the viewer. The magazine pages may be retrieved from the storage device 18 or received from a broadcast station 12 or transmitting station 14, and merged with the clips retrieved from the storage device 18 by control processor 30 and transport stage 28. This data is then sent to the AV stage 34 for display on TV 20. The functional diagram is shown in FIG. 6, where a magazine navigator 52, under control of viewer 56, retrieves magazine pages from storage device 18 or receives magazine pages from broadcast station 12 or transmitting station 14 (not shown in this figure). Clips referenced by the magazine page and stored in storage device 18 are retrieved and merged with the magazine page by the merge 54. The magazine page thus created is sent to TV 20 for presentation to the viewer 56. If the viewer selects a hyperlink or otherwise commands the system 10 to retrieve a clip, the new clip is retrieved from storage device 18 for merging with the magazine page as before. If the viewer selects a new magazine page, such as by selecting a hyperlink, sequentially paging through the magazine, entering a specific page, or selecting another magazine, a new magazine page and clip(s) referenced by the magazine page may be retrieved and processed as described above. The set top box 16 may include multiple tuners 24 for recording and displaying various streams broadcast in separate transport streams. For example, one tuner 24 could be used by the viewer to watch a program, while other tuners 24 are used for retrieving clips for the magazine. Still another tuner 24 could be used to record a program specified by the viewer.

Figure 7:
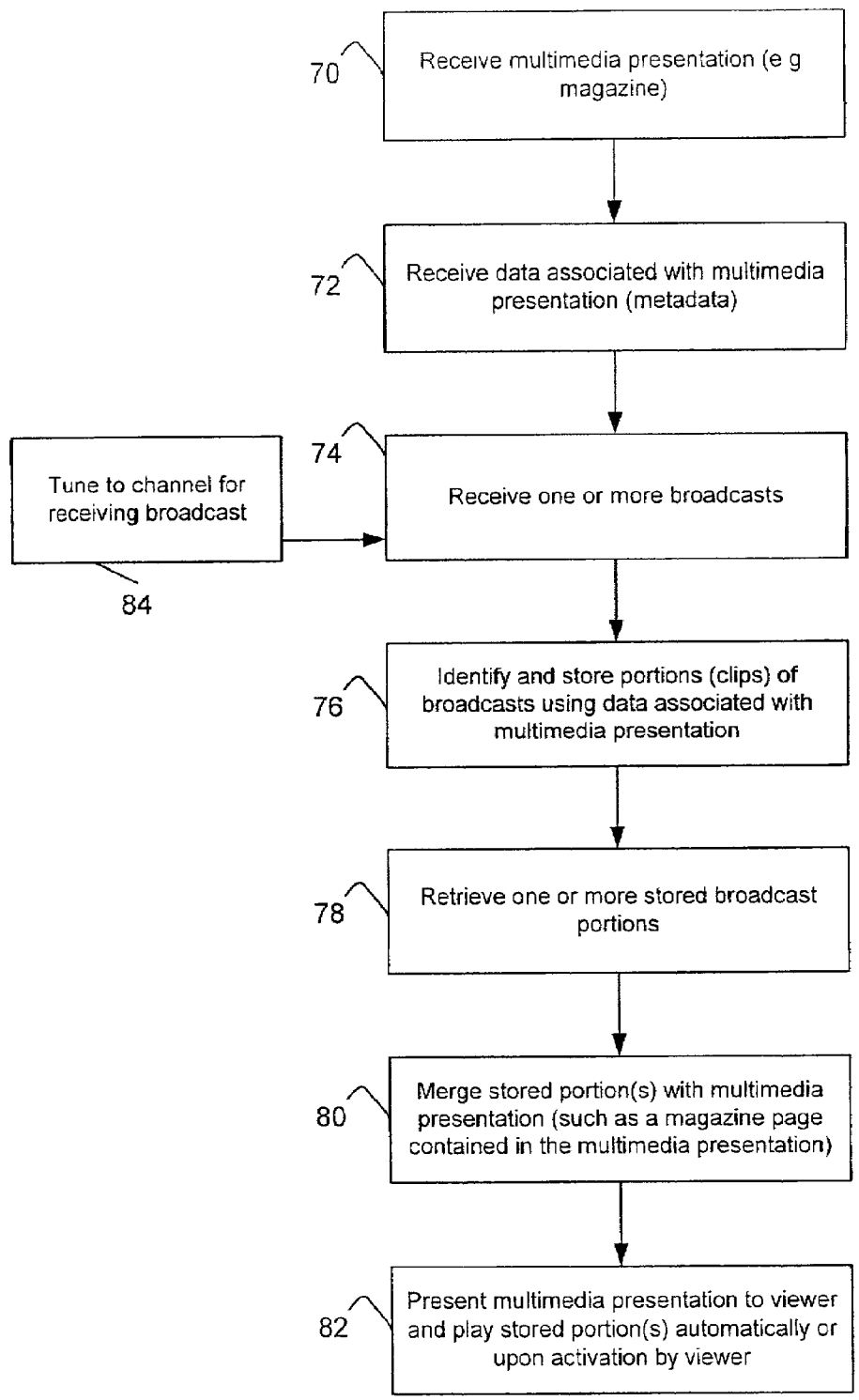
FIG. 7 is a flowchart of a method in accordance with the invention.

FIG. 7 shows a process flow in an embodiment of the invention. In step 70, the system 10 receives a magazine (e.g., as a magazine page 50). The system 10 receives magazine metadata, step 72. Using the front end 26, the system 10 receives broadcasts, step 74, and when it identifies portions of broadcasts relevant to metadata, the system stores the portions, step 76. The system 10 may also tune to the channel on which the broadcast is to be received, step 84. This step may be performed multiple times, receiving broadcast portions each time, if the broadcast portions to be received are on different channels. When the viewer wishes to view the magazine, the system 10 uses the magazine information to retrieve a stored broadcast portion (or portions), as shown in step 78. The system then merges the stored broadcast portion with the magazine page, step 80. The magazine is presented to the viewer and the stored broadcast portion is played, step 82.

Figure 8:
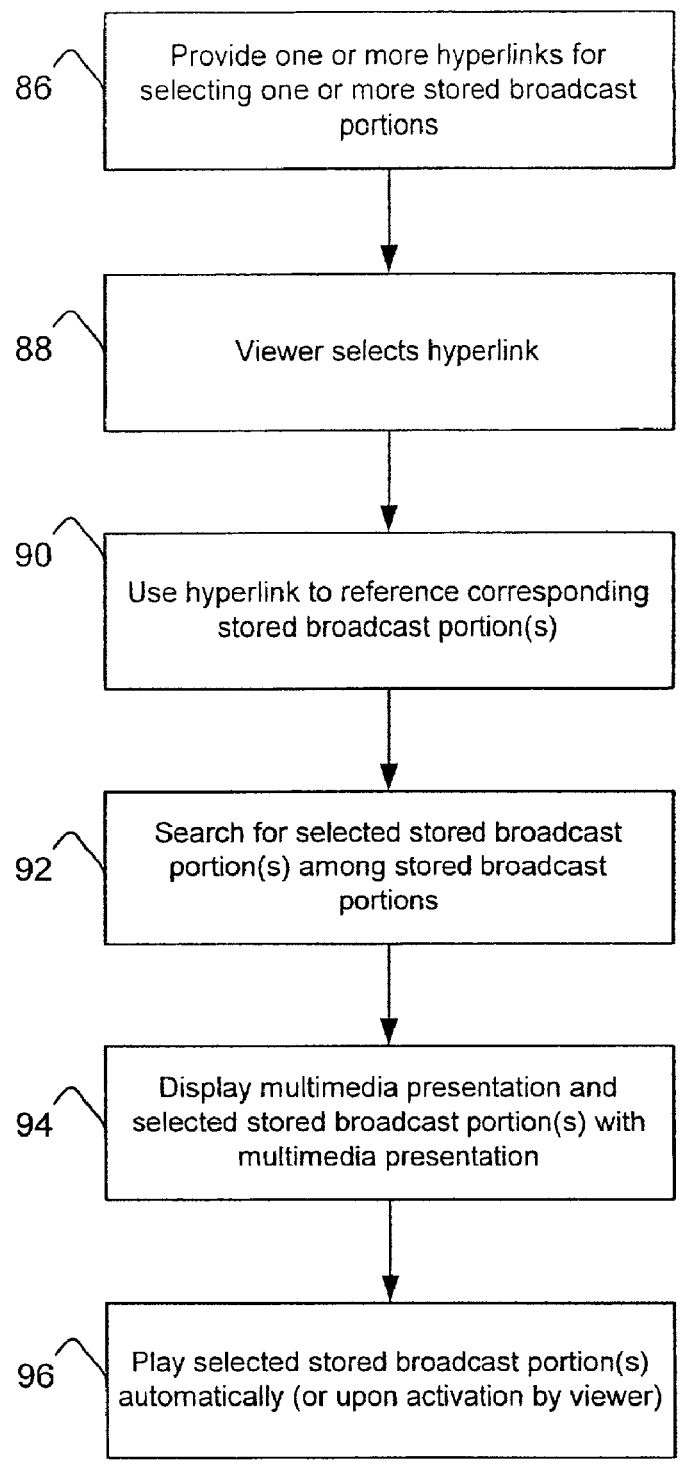
FIG. 8 is a flowchart of a method of presenting a stored broadcast portion for display.

The selection of broadcast portions for presentation is shown in FIG. 8. In step 86, one or more hyperlinks are provided for selecting one or more stored broadcast portions. There may be more than one hyperlink to a stored broadcast portion, and the hyperlinks may be on different pages. A hyperlink may reference more than one stored broadcast portion. The viewer selects a hyperlink, step 88, and the hyperlink is used to reference the selected stored broadcast portion(s), step 90. In step 92, the system searches for each selected stored broadcast portion among the stored broadcast portions, and displays it with the magazine, step 94. Each selected stored broadcast portion may be played automatically or may be played when activated by the viewer, step 96. The metadata may specify whether the stored broadcast portion should be played automatically.

Figure 9:
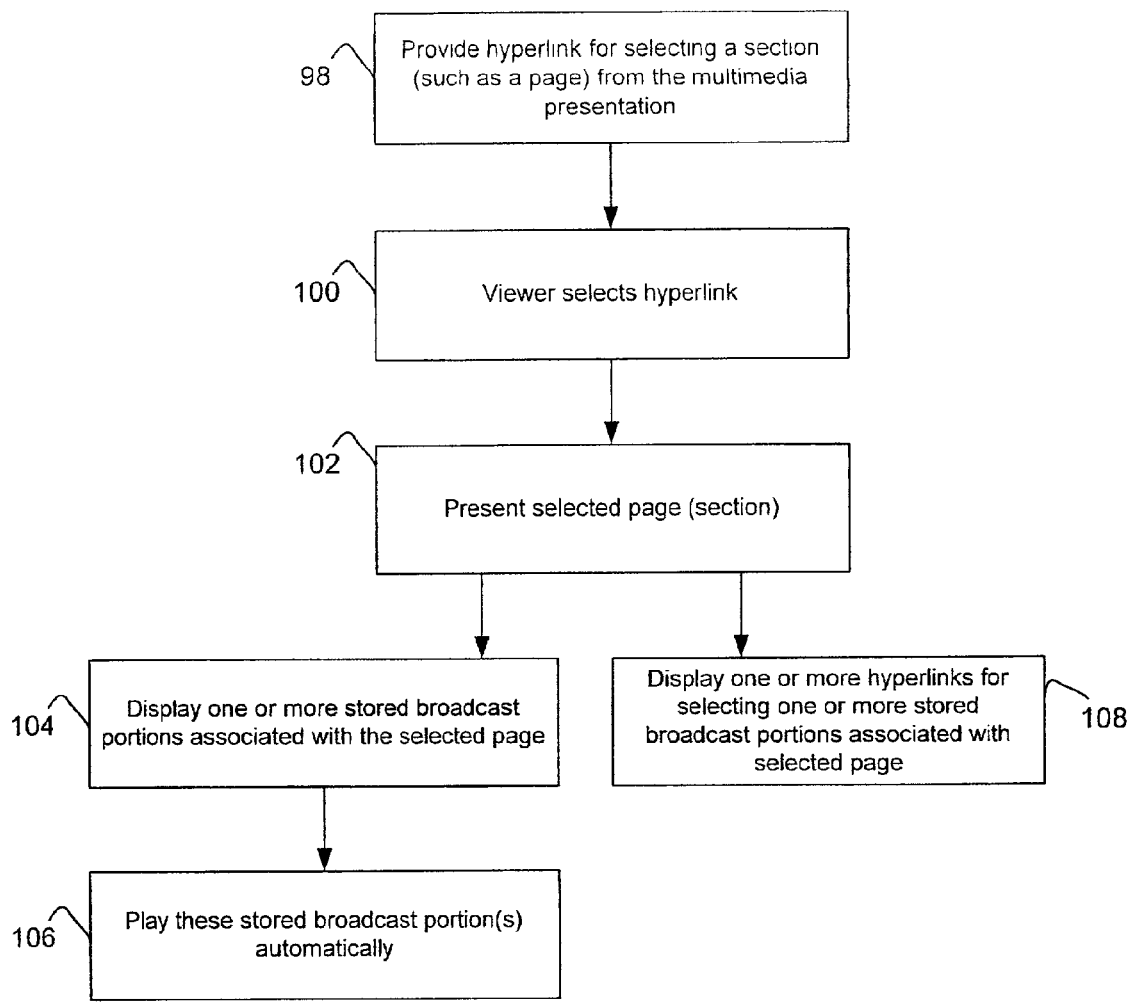
FIG. 9 is a flowchart of a method of presenting a magazine page with one or more associated stored broadcast portions.

FIG. 9 shows the flow for presenting a page with associated stored broadcast portions. In step 98, a hyperlink may be provided for selecting a section of a multimedia presentation, such as a magazine page. After the viewer selects the hyperlink, step 100, the system presents the selected page, step 102. When the selected page is presented, one or more hyperlinks for selecting stored a broadcast portions (such as audio/video clips) associated with the page may be displayed, step 108, or hyperlinks for selecting other pages may be displayed. Alternatively, or in addition, the stored broadcast portions associated with the page may be displayed, step 104, and played automatically, step 106.

For the sake of clarity, the processes have been illustrated with specific flows, but it should be understood that other sequences are possible and that some may be performed in parallel, without departing from the spirit of the invention. Additionally, steps may be subdivided or combined. For example, the magazine does not need to be received at the beginning of the flow, but may instead be received after the metadata has been received and broadcast portions have been stored. As another example, the magazine may also be received while portions of the broadcasts are being stored or retrieved.

A method and system for processing broadcasts have been disclosed. More particularly, a method and system for providing an on-demand interactive magazine have been disclosed. Software written according to the present invention may be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for presenting a multimedia presentation, comprising:

receiving a broadcast program comprising a first presentation;

receiving data which indicates one or more portions of the broadcast program may also be utilized as part of second presentation comprising an interactive magazine;

storing said one or more portions responsive to detecting said data;

receiving magazine pages and associated metadata; and utilizing the metadata to retrieve and present said stored one or more portions as part of the presentation of the interactive magazine.

2. The method as recited in claim 1, wherein receiving the at least one broadcast includes receiving broadcasts from a plurality of channels.

3. The method as recited in claim 2, wherein receiving broadcasts from a plurality of channels includes tuning to the channel on which a broadcast is to be received.

4. The method as recited in claim 1, wherein at least one page of the interactive magazine includes at least one hyperlink for selecting and retrieving one or more of said portions.

5. The method as recited in claim 4, wherein the interactive magazine is presented as an electronic magazine comprising a plurality of pages.

6. The method as recited in claim 4, wherein retrieving the one or more of said portions includes searching the stored portions of the broadcasts.

7. The method as recited in claim 1, wherein playing the at least one stored broadcast portion is automatic.

8. The method as recited in claim 1, wherein the at least one stored broadcast portion is displayed integral with a page of the interactive magazine.

9. The method as recited in claim 1, wherein the at least one stored broadcast portion is displayed within the interactive magazine.

10. The method as recited in claim 1, wherein the interactive magazine includes a plurality of pages.

11. The method as recited in claim 10, wherein presenting the interactive magazine includes providing at least one hyperlink operable to select one of the plurality of pages.

12. The method as recited in claim 11, wherein presenting the interactive magazine includes presenting a selected page.

13. The method as recited in claim 12, wherein presenting the selected page includes playing at least one stored broadcast portion associated with the selected page.

14. The method as recited in claim 10, wherein at least one stored broadcast portion is associated with more than one page.

15. The method as recited in claim 1, wherein receiving the interactive magazine and associated data includes receiving from a point-to-point connection.

16. The method as recited in claim 1, further comprising storing at least one of the plurality of magazine pages.

17. The method as recited in claim 1, wherein storing portions of the broadcast includes comparing the data to a viewer profile.

18. The method as recited in claim 1, wherein the data includes metadata.

19. A method of providing a magazine, comprising:

transmitting a broadcast program comprising a first presentation;

transmitting data which indicates one or more portions of the broadcast program may also be utilized as part of second presentation comprising an interactive magazine, wherein said data is operable by a receiver to store said one or more portions responsive to detecting said data; transmitting magazine pages and associated metadata, said metadata being operable in said receiver to retrieve and present said stored one or more portions as part of the presentation of the interactive magazine.

20. A system for providing a magazine, comprising:

a first receiver operable to receive at least one broadcast program comprising a first presentation, and data which indicates one or more portions of the broadcast program may also be utilized as part of a second presentation comprising an interactive magazine;

a second receiver configured to receive magazine pages and associated metadata;

a storage device; and a processor configured to;

store said one or more portions responsive to detecting said data; and utilize the metadata to retrieve and present said stored one or more portions as part of the presentation of the interactive magazine.

21. A computer program product for processing broadcasts, comprising a computer usable medium having machine readable code embodied therein for:

receive a broadcast program comprising a first presentation;

receive data which indicates one or more portions of the broadcast program may also be utilized as part of second presentation comprising an interactive magazine;

store said one or more portions responsive to detecting said data;

receive magazine pages and associated metadata; and utilizing the metadata to retrieve and present said stored one or more portions as part of the presentation of the interactive magazine.

\* \* \* \* \*